(12) United States Patent
Bohlin et al.

(10) Patent No.: US 8,981,222 B2
(45) Date of Patent: Mar. 17, 2015

(54) CABLE TERMINATION DEVICE, A METHOD FOR PREFABRICATING A CABLE TERMINATION DEVICE AND A METHOD FOR ACHIEVING A CABLE TERMINATION

(71) Applicants: Ake Bohlin, Alingsas (SE); Hans Rapp, Alingsas (SE); Jorgen Svahn, Dubai (AE); Martin Purin, Linkoping (SE); Daniel Martensson, Alingsas (SE)

(72) Inventors: Ake Bohlin, Alingsas (SE); Hans Rapp, Alingsas (SE); Jorgen Svahn, Dubai (AE); Martin Purin, Linkoping (SE); Daniel Martensson, Alingsas (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 14/085,237

(22) Filed: Nov. 20, 2013

(65) Prior Publication Data
US 2014/0076624 A1 Mar. 20, 2014

Related U.S. Application Data

(63) Continuation of application No. PCT/EP2011/066520, filed on Sep. 22, 2011.

(60) Provisional application No. 61/488,178, filed on May 20, 2011.

(51) Int. Cl.
*H02G 15/02* (2006.01)
*H02G 7/05* (2006.01)
(Continued)

(52) U.S. Cl.
CPC ............... *H02G 7/05* (2013.01); *H02G 15/046* (2013.01); *H02G 15/064* (2013.01); *H02G 1/04* (2013.01)
USPC ....... 174/73.1; 174/74 R; 174/75 R; 174/167; 174/168; 174/169; 174/176; 29/825

(58) Field of Classification Search
CPC ........... H02G 15/02; H02G 7/05; H02G 1/04; H02G 15/046; H02G 15/064; H02G 15/068; H02G 15/103; H02G 15/105; H02G 15/184
USPC ..... 173/73.1, 74 R, 74 A, 75 R, 75 D, 76, 78, 173/79, 80, 82, 84 R, 85, 86, 88 C, 88 S, 89, 173/93, 167, 168, 169, 176; 174/73.1, 74 R, 174/74 A, 75 R, 75 D, 76, 78, 79, 80, 82, 174/84 R, 85, 86, 88 C, 88 S, 89, 93, 167, 174/168, 169, 176
See application file for complete search history.

(56) References Cited

U.S. PATENT DOCUMENTS 3,198,877 A * 8/1965 Olson et al. ............... 174/74 R
(Continued)

FOREIGN PATENT DOCUMENTS

| FR | 2770940 A1 | 5/1999 |
|---|---|---|
| JP | 2002315171 A | 10/2002 |

(Continued)

OTHER PUBLICATIONS

International Preliminary Report on Patentability Application No. PCT/EP2011/066520 Completed: Oct. 7, 2013 12 pages.
(Continued)

*Primary Examiner* — Ishwarbahai B Patel
*Assistant Examiner* — Paresh Paghadal
(74) *Attorney, Agent, or Firm* — St. Onge Steward Johnston & Reens LLC (57) ABSTRACT

A cable termination device of the dry type, for terminating a high voltage cable, including an insulator housing with a first end and a second end and having a hollow interior, and which second end has an opening for insertion of a high voltage cable. The cable termination device further includes a stress controller device located inside the insulator housing and adapted to be mounted on a high voltage cable, an end cap located at the first end of the insulator housing and provided with an external electrical connection means, and an electrically insulating gel filling at least part of the hollow interior of the insulator housing and surrounding at least part of the stress controller device. Further, the stress controller device is provided with a first and a second deflector arrangement for controlling an electric field.

17 Claims, 4 Drawing Sheets

(51) Int. Cl.
  *H02G 15/04* (2006.01)
  *H02G 15/064* (2006.01)
  *H02G 1/04* (2006.01)

(56) References Cited

U.S. PATENT DOCUMENTS 3,548,070 A * 12/1970 Duenke .................... 174/12 BH
5,130,495 A * 7/1992 Thompson ................... 174/73.1
5,406,030 A * 4/1995 Boggs .......................... 174/73.1

FOREIGN PATENT DOCUMENTS

| | | |
|---|---|---|
| JP | 2010016986 A | 1/2010 |
| WO | 9203865 A1 | 3/1992 |
| WO | 9731417 A1 | 8/1997 |
| WO | 2011043313 A1 | 4/2011 |

OTHER PUBLICATIONS

International Search Report & Written Opinion of the International Searching Authority Application No. PCT/EP2011/066520 Completed: May 21, 2013; Mailing Date: May 29, 2013 8 pages.

* cited by examiner

CABLE TERMINATION DEVICE, A METHOD FOR PREFABRICATING A CABLE TERMINATION DEVICE AND A METHOD FOR ACHIEVING A CABLE TERMINATION

FIELD OF THE INVENTION

The present invention relates to a cable termination device of the dry type, and a method for achieving a cable termination on a cable, such as a high voltage cable. In particular, the present invention relates to terminations for electric cables used for electric power distribution.

BACKGROUND OF THE INVENTION

Cables used for electric power distribution are typically operated at thousands of volts, and consequently care must be taken when terminating these cables and connecting them to electrical components, e.g. switchgear units. At the point where the cable is terminated electrical stress occurs that needs to be controlled.

The cable termination typically requires that various dielectric, insulation, semi-conducting and conductive shield layers that surrounds the central current carrying conductor are removed, and that the various semi-conducting and conducting surrounding layers are appropriately connected to the involved electrical equipment. In particular, electric stress occurs at sudden changes in the cable shielding system, e.g. where a semi-conducting outer layer is cut away.

A cable termination for medium and high voltages is normally an insulator comprising a housing inside which is located a stress control device mounted on the cable. The insulator housing is usually of porcelain or a composite. The function of the stress control device is to control the electric field, e.g. where an outer semi-conducting layer is cut away. The stress control device is often cone-shaped, and referred to as a stress cone. The housing is filled with an electrical insulation medium. This insulation medium is traditionally oil, in which case the cable termination device is referred to as being of the wet type. The cable termination device may alternatively be of the so called dry type, for example when the insulation material is an elastomeric compound as in U.S. Pat. No. 5,130,495, or a gel of some suitable kind, e.g. a polymer or silicone gel.

Traditionally, the different parts of the cable termination device are assembled at the end site and mounted on the cable. The device is then raised in an upright position. Finally, the electrical insulating medium, such as oil, is filled into the insulator housing and the housing is then sealed by mounting of the top end cap and the external electrical connection.

The assembling work at site is a time consuming procedure with a medium such as oil that is unfriendly to the environment. There are risks involved, for example if the cable termination should explode the damage would be severe with burning oil.

The existing dry types of cable termination devices have the main drawback of being expensive.

SUMMARY OF THE INVENTION

An object of the present invention is to provide a cable termination device of the dry type, for terminating a cable including a high voltage current-carrying conductor, and which cable termination device may be prefabricated and then transported to a final site where it is installed on a cable in a simple and safe manner. Another object is to provide a corresponding method. By the used term "high voltage" is referred to electric voltages of 36 kV and above, and often much higher such as hundreds of kilo volt.

The object of the present invention is achieved by a cable termination device, by a method for prefabricating a cable termination device, and by a method for achieving a cable termination.

Accordingly is disclosed a cable termination device of the dry type, for terminating a high voltage cable, comprising an insulator housing with a first end and a second end and having a hollow interior, which second end has an opening for insertion of the cable, further comprising a stress controller device located inside the insulator housing, and adapted to be mounted on a high voltage cable, an end cap located at the first end of the insulator housing and provided with an external electrical connection means, and an electrically insulating gel filling at least part of the hollow interior of the insulator housing and surrounding at least part of the stress controller device, characterised in that the stress controller device is provided with a first and a second deflector arrangement for controlling an electric field.

An advantage with having two deflectors on the stress controller device is that the stress controller device may be made shorter than a conventional conical stress controller device having only one deflector, and that this it is less complicated to manufacture than the much longer conventional conical stress controller devices. It is also easier to insert the cable when the stress controller device is shorter.

Another advantage is that the provision of two deflector arrangements makes it possible to concentrate the control of the electric field to the region between the two deflector arrangements. This will be described in more detail below.

According to a feature, the cable termination device according to the present invention may comprise an electrically conducting element that is electrically connected at one end to the second deflector arrangement and electrically connected at its other end to a conductor connector at the end cap, which conductor connector is adapted for connection to a current carrying conductor of a high voltage cable inserted into the cable termination device, and wherein the first deflector arrangement is adapted to be electrically connectable to an outer conductive or semi-conductive layer of a cable.

According to another feature, the stress controller device may have a first end mounted at the second end of the insulator housing and that it extends from the second end of the insulator housing and into the insulator housing where it has a second end, and wherein the second deflector arrangement is arranged at said second end of the stress controller device.

Through this is offered the advantage that the second, upper deflector arrangement has the same electric potential as the current carrying conductor of the cable, by means of the connection provided by the electrically conducting element and the conductor connector. In other words, the second, upper deflector arrangement is connected to full voltage. The first, lower deflector arrangement is connected to ground level, via the insulator housing. Consequently, the entire voltage drop and the control of electric fields and stress are concentrated to the region between the two deflector arrangements. The region above the second upper deflector arrangement will in principle be free of electric fields and stress. Consequently, the present invention offers big advantages, and opens up for new possibilities and simpler solutions in this technical field.

According to one further feature, the cable termination device according to the present invention may comprise a pipe-shaped member arranged extending inside the insulator housing from the second deflector arrangement of the stress controller device in a direction towards the end cap and at least partly up to the end cap and which pipe-shaped member is adapted to receive a cable, whereby a space is formed between an inner wall of the insulator housing and the stress controller device combined with the pipe-shaped member and that said space is at least partly filled with insulating gel.

According to one embodiment, the cable termination device according to the present invention may have a pipe-shaped member made of an electrically conducting material and thereby the pipe-shaped member may constitute the electrically conducting element.

According to another embodiment, the pipe-shaped member may comprise a first layer made of an electrically insulating material and a second layer made of an electrically conducting material, and said second layer may constitute said electrically conducting element.

According to yet another embodiment, the pipe-shaped member may be of an electrically insulating material and the electrically conducting element may be an electric conductor running alongside and inside the pipe-shaped member. According to a variant of this last mentioned embodiment, the pipe-shaped member does not extend all the way up to the end cap, wherein the maximum level of gel inside the insulator housing is below an upper free end of the pipe-shaped member, and wherein the electric conductor runs all the way up and is connected to the conductor connector at the end cap.

Through this invention is achieved the further advantage that the cable termination device may be prefabricated, including the filling of the device with an insulating medium. The insulating medium inside the device is a gel that may be in such a viscous form initially that it may be poured into the insulator housing when the device is in an upright position, and which will then form a gel after a short period of time, thus allowing the entire device to be handled without any consideration to if it is upright, or lying on its side etc. Consequently, the prefabricated device may be easily transported to its final site. By arranging a pipe-shaped member at the second end of the stress controller device, where the second deflector arrangement is located, and which pipe-shaped member extends at least part of the way up to the first end of the insulating housing where the end cap is, is provided the advantage that it will be possible to fill the interior of the insulating housing with insulating gel also above the stress controller device and thereby have a better control of the electrical field. Examples of insulating gel are polymer based insulating gel, silicone gel, or any other type of suitable gel that can be in liquid form in order to be poured into the insulator housing, where it will then change or be made to change into gel form.

The pipe-shaped member will also provide a channel for the cable that will protect the cable and facilitate insertion of the cable.

The dry type of cable termination device according to the present invention also has the advantage of a simpler, safer and quicker installation, since no insulating medium has to be poured into the device at the installation site, it is a more environmental friendly product and in case of failure there is less risk of causing damage to the surrounding environment. For example, if there should be an explosion, the insulating gel is close to harmless compared to oil.

The cable termination device according to the present invention does not necessarily have to be installed in a vertically upright position, but may also be stored and installed at an angle to the vertical plane.

According to another feature, the stress controller device comprises a stress control member and a support pipe wherein the stress control member is mounted to the second end of the insulator housing by means of the support pipe, wherein the first deflector arrangement is provided at one end of the stress control member that is connected to the support pipe and the second deflector arrangement is provided at the opposite end of the stress control member forming the second end of the stress controller device.

The advantage of using a support pipe and mounting the stress control member, i.e. the member that performs the actual stress control function, on the support pipe is that the stress control member will be located higher up in the insulator housing which will result in a better stress control function. The support pipe also keeps the internal part of the insulator housing that is below the stress control member free from insulating gel and therefore facilitates the insertion of the cable into the housing and into the stress control member.

According to another feature, the cable termination device may be self supporting, which makes it easier to handle, transport and install.

The stress controller device and the surrounding electrically insulating gel may also form a compressible unit which can adapt to different cable diameters. Generally, the compressibility will also facilitate the insertion of the cable into the stress controller device and the entire cable termination device.

According to yet another feature is defined that the cable termination device, according to the present invention, may be prefabricated, before installation on a cable.

According to the present invention is also defined a method for prefabricating a cable termination on a high voltage cable, comprising:

mounting a stress controller device, having a hollow interior adapted for insertion of a cable, and having a first and a second deflector arrangement of which the first deflector arrangement is connectable to an outer conductive or semi-conductive layer of a cable, inside a hollow interior of an insulator housing, said insulator housing having a first end and a second end, by mounting the stress controller device by a first end to the second end of the insulator housing, said second end of the insulator housing having an opening for insertion of a cable into the insulator housing, mounting a pipe-shaped member at a second end of the stress controller device, which second end is located inside the insulator housing, such that the pipe-shaped member extends inside the insulator housing in a direction towards the end cap and at least partly up to the end cap and which pipe-shaped member is adapted to receive a cable, whereby a space is formed between an inner wall of the insulator housing and the stress controller device combined with the pipe-shaped member, mounting an electrically conducting element inside the insulator housing by connecting the electrically conducting element to the second deflector arrangement for controlling an electric field, which second deflector arrangement is provided at the second end of the stress controller device, and further connecting the electrically conducting element to a conductor connector at the end cap, which conductor connector is adapted for connection to a current carrying conductor of a high voltage cable inserted into the cable termination device, and filling an electrically insulating gel into the insulator housing such that said space is at least partly filled with insulating gel.

This method offers advantages corresponding to the advantages already described above.

According to the inventive method is further defined that mounting of the pipe-shaped member and mounting of the electrically conducting element is made in one and the same step by mounting a pipe-shaped member made of an electrically conducting material, thus forming an electrically conducting element, between the deflector arrangement provided at the second end of the stress controller device and the conductor connector.

According to an alternative method is defined that mounting of the pipe-shaped member and mounting of the electrically conducting element is made in one and the same step by mounting a pipe-shaped member comprising a first layer made of an electrically insulating material and a second layer made of an electrically conducting material, and said second layer constituting said electrically conducting element, between the deflector arrangement provided at the second end of the stress controller device and the conductor connector.

According to another alternative method is defined the mounting of an electric conductor forming the electrically conducting element, at least partly alongside and inside the pipe-shaped member.

The inventive method may further be characterized by mounting a stress control member on a support pipe thereby forming the stress controller device, and connecting the stress controller device by means of the support pipe to the insulator housing and/or the base member.

Finally, according to a further aspect of the present invention is defined a method for achieving a cable termination on a high voltage cable, comprising installation of a prefabricated cable termination device on a high voltage cable.

To summarize, through the present invention is obtained the advantages of a cable termination device that is dry both before and after installation on the cable, and a cable termination device that is prefabricated and totally ready to be installed on the cable when it arrives on the installation site, in other words a cable termination device of a "plug and play" type. Furthermore, the cable termination device can be used on cables having differing diameters.

BRIEF DESCRIPTION OF THE DRAWINGS

The invention will now be described in more detail, with reference being made to the enclosed schematic drawings illustrating different aspects and embodiments of the present invention, given as examples only, and in which.

In the drawings, the same elements or corresponding elements in the different embodiments have been given the same reference number.

DETAILED DESCRIPTION OF THE INVENTION

Figure 1:
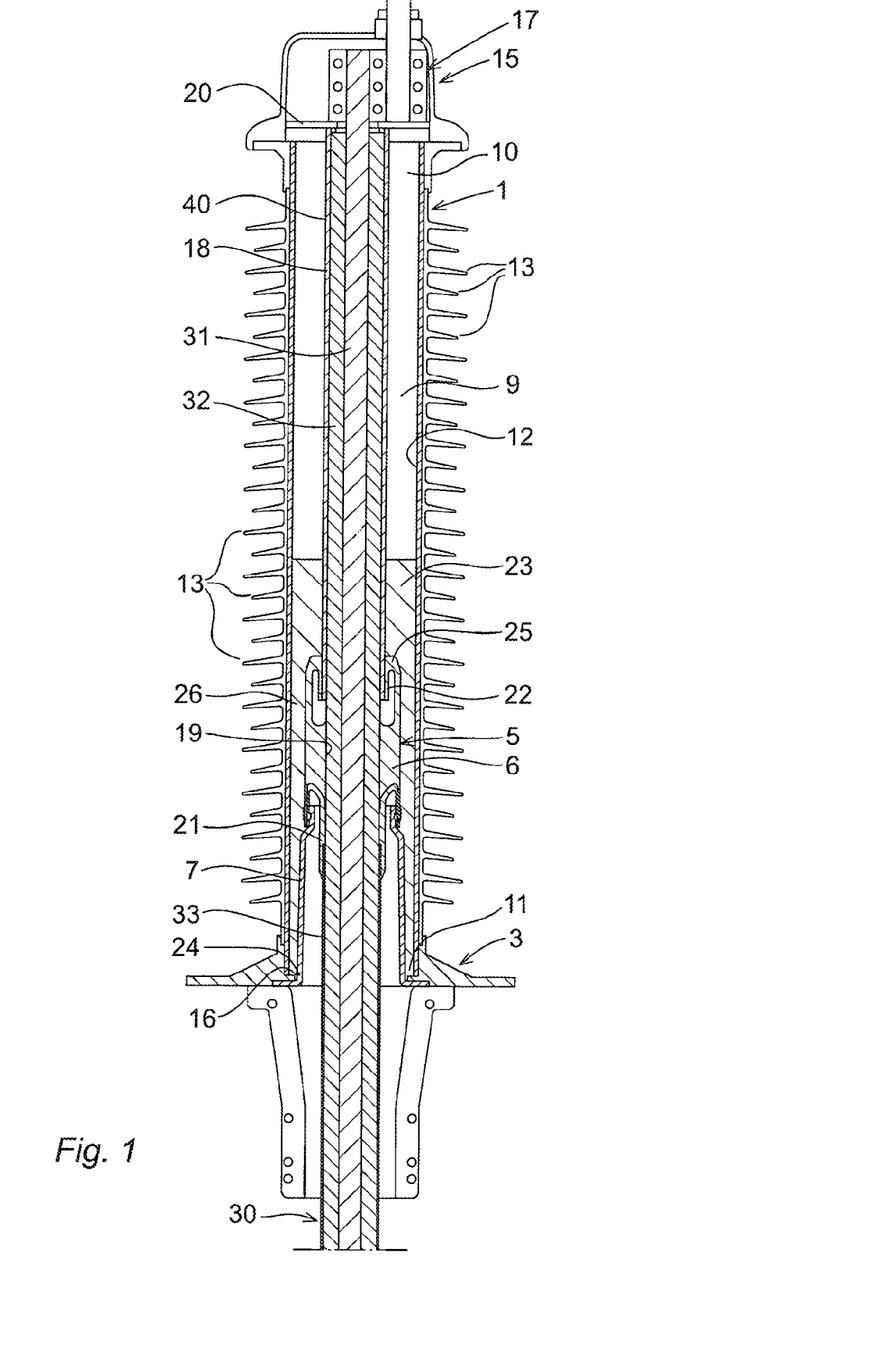
FIG. 1 shows schematically a cable termination device according to a first embodiment of the present invention, partially in cross section, and also showing a cable inserted therein.

The cable termination device, according to the present invention, of which an embodiment is shown in FIG. 1, comprises an insulator housing 1, including a base member 3, and a stress controller device 5. The stress controller device 5 in the illustrated example comprises a stress control member or stress cone 6, and an intermediate support pipe 7. The stress control member 6 is mounted on the intermediate support pipe 7, which in turn is mounted on the base member 3 of the insulator housing. The stress controller device 5 is located inside the insulator housing 1. The insulator housing 1 has a hollow interior 9, and it has two open ends, an upper end forming a first end 10 and a lower end forming a second end 11. Usually, the shape of the insulator housing is basically cylindrical with a central bore 12 forming an inner wall of the insulator housing, sometimes with a tapering at one or both the ends. The insulator housing may be provided with a series of skirts 13 on its external surface and outwardly extending therefrom. Preferably the insulator housing is rigid and made of glass fibre, epoxy, silicone, a polymer, rubber or any other material normally used for this type of device. The insulator housing may also have a core made of one material, e.g. glass fibre reinforced epoxy, and the skirts 13 may be made of a different material, e.g. silicone.

At the upper end 10, the insulator housing is sealed with an end cap 15, provided with an external electric connection 17 to which an inner electric conductor 31 of a cable 30 is connected, when the cable termination device is installed on a cable.

An example of a cable 30 for which the inventive cable termination device may be used, is a high voltage cable of the XLPE type, having an inner current carrying conductor 31 surrounded by an insulation layer 32 of XLPE, and an outer conductive or semi-conductive layer 33. Before the cable is inserted into the cable termination device, the cable end is prepared by peeling off the outer conductive or semi-conductive layer 33 such that the cable end extending from the stress controller device 5 up to the end cap 15 is free of this layer.

The stress controller device 5 is mounted at its first lower end 24 inside the hollow interior 9 of the insulator housing 1 by means of the support pipe 7 being mounted at the second lower end 11 of the insulator housing. The stress controller device 5 extends from the second lower end 11 and into the insulator housing and it has an overall length that is shorter than the length of the hollow interior of the insulator housing 1, i.e. it does not stretch all the way up to the end cap 15. The reason is that the longer the stress control member 6 of the stress controller device 5 is, the more difficult is will be to insert the cable, and therefore the stress control member 6 should not be made longer than is necessary to obtain the required control of the electric fields.

Between the upper, second end 25 of the stress controller device 5, which is also the upper end of the stress control member 6, and the upper end cap 15, is arranged a pipe-shaped member 18 which is adapted to receive a cable 30. In the embodiment of FIG. 1, the pipe-shaped member 18 is made of an electrically conducting material, thus forming an electrically conducting element 40. At its upper end, the pipe-shaped member/electrically conducting element is electrically connected to a conductor connector 20 in the shape of a plate and located at the end cap 15. The conductor connector 20 is adapted to connect to the conductor 31 of the high voltage cable, when the cable termination device is mounted on a cable. The conductor connector plate 20 is in electric contact with a cable clamp mounted on the cable conductor and which is also used for external electric connection 17.

The stress control member 6 is preferably of a polymer material, rubber or similar which is at least somewhat resilient. It may also have parts made of different materials. The function of the stress control member is to control and reduce the electric field and minimize electric stress generated at the cable termination.

The stress control member 6 is provided with a first, lower deflector arrangement 21 at its lower end, where the cable is inserted, and which lower deflector arrangement will surround the cable. The lower deflector arrangement 21 has the function of controlling and reducing the electric field and minimizing electric stress occurring in the region where the outer conductive or semi-conductive layer 33 of the cable is removed.

The stress control member 6 is provided with a second, upper deflector arrangement 22, which surrounds the lower end of the pipe-shaped member 18, which also forms an electrically conducting element 40. This second deflector arrangement has the function of controlling and reducing the electric field and minimizing electric stress occurring around the end of the pipe-shaped and electrically conducting member 18/40.

The second, upper deflector arrangement 22 has the same electric potential as the cable conductor 31, by means of the connection provided by the pipe-shaped and electrically conducting member 18/40 and the conductor connector 20. In other words, the second, upper deflector arrangement is connected to full voltage. The first, lower deflector arrangement 21 is connected to ground level, via the support pipe 7 and the insulator housing. Consequently, the entire voltage drop and the control of electric fields and stress are concentrated to the region between the two deflector arrangements 21, 22. The region above the second upper deflector arrangement will in principle be free of electric fields and stress.

Figure 2:
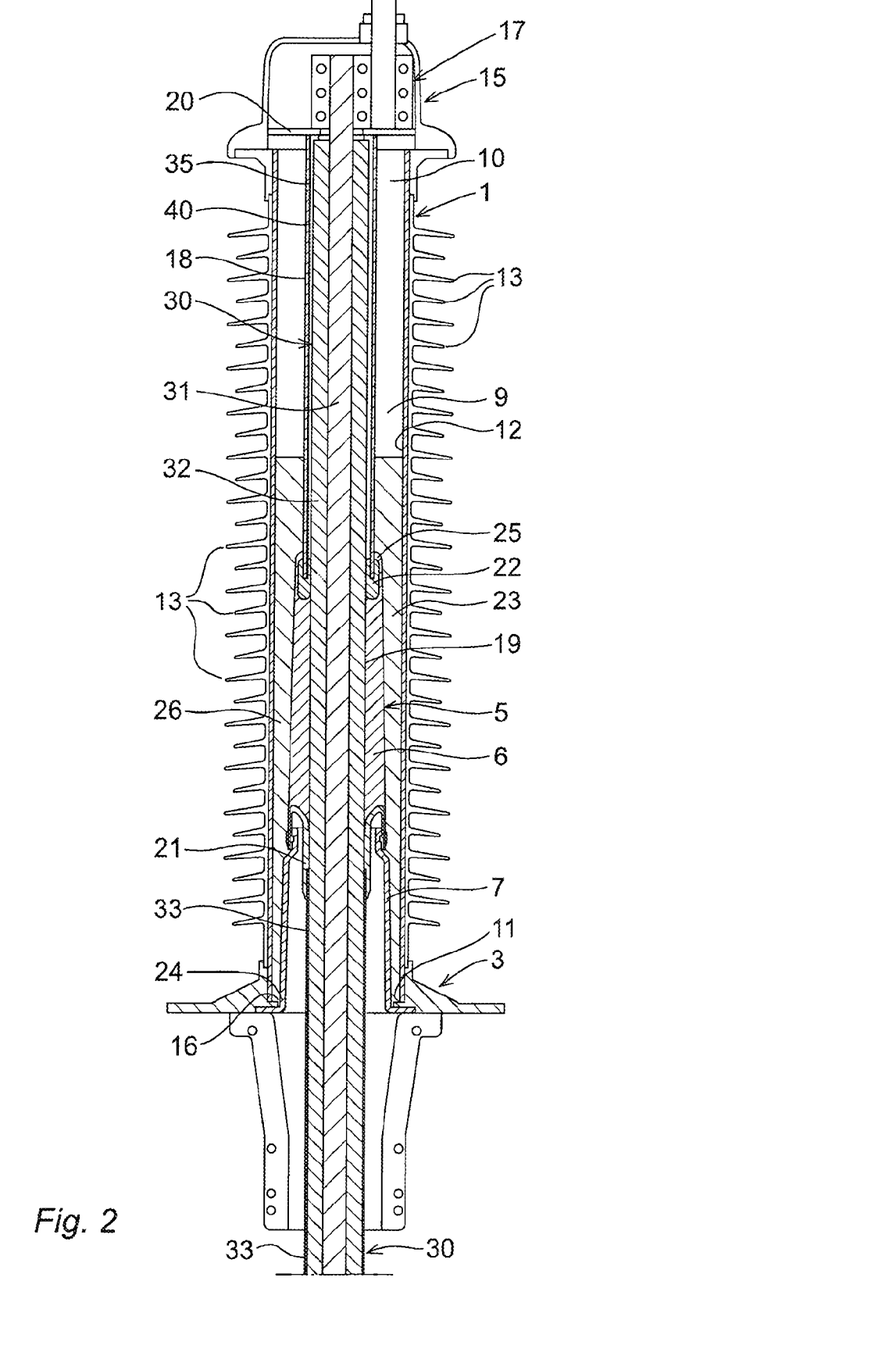
FIG. 2 shows schematically a cable termination device according to a second embodiment of the present invention, partially in cross section, and also showing a cable inserted therein.
Figure 3:
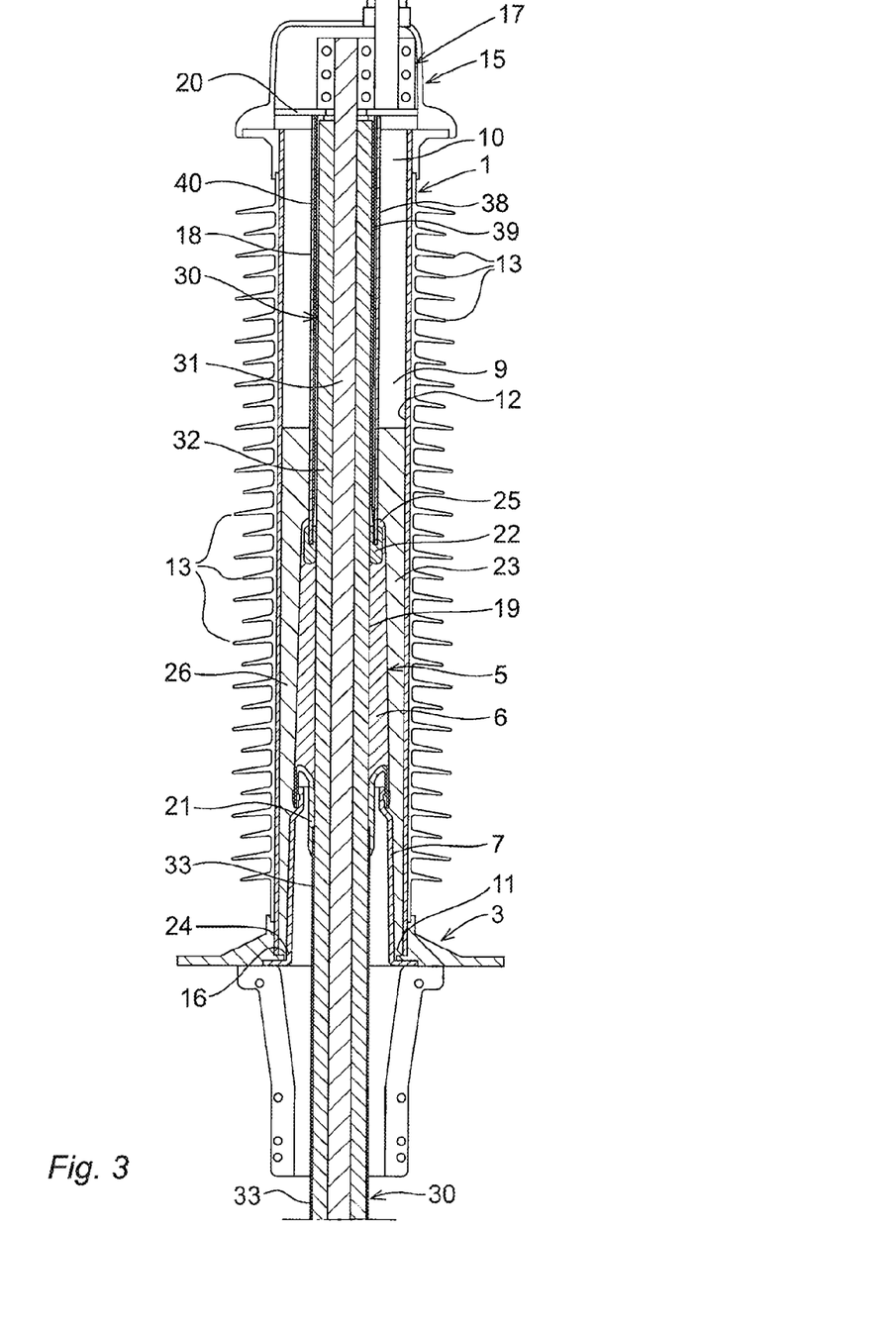
FIG. 3 shows schematically a cable termination device according to a third embodiment of the present invention, partially in cross section, and also showing a cable inserted therein.
Figure 4:
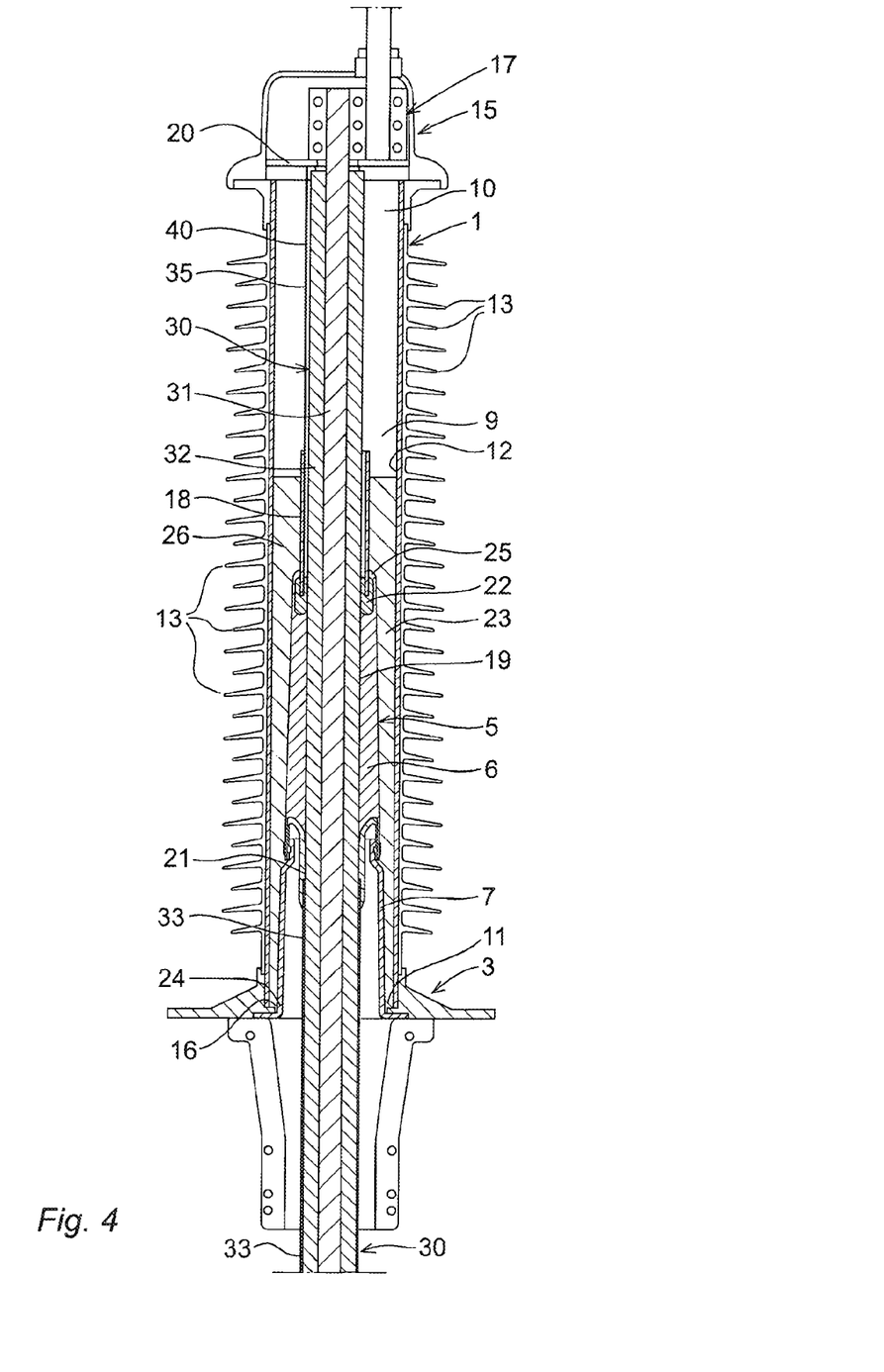
FIG. 4 shows schematically a cable termination device according to a variant of the second embodiment of the present invention, partially in cross section, and also showing a cable inserted therein.

In the illustrated example, the stress control member 6 has a basically cylindrical external shape, but it may also have other suitable shapes, for example conical as illustrated in FIGS. 2, 3 and 4. Inside the stress control member 6 is provided a central bore 19 adapted to receive a cable.

The support pipe 7 has the function of making it possible for the stress control member 6 of the stress controller device 5 to be located higher up inside the insulator housing 1. The higher location of the stress control member provides for a better effect. The support pipe 7 also provides for a free space below the stress control member 6 which facilitates the insertion of the cable 30 into the insulator housing and into the stress control member 6. The support pipe is made of an electrically insulating material.

In the illustrated example, the insulator housing 1 is filled with an electrically insulating gel 23, in its lower part. The insulating gel surrounds the stress controller device 5 and preferably also at least a lower portion of the pipe-shaped and electrically conducting member 18. In practice, the level of insulating gel may be as high above the stress controller device as is necessary from case to case based on the need to reduce the electric fields. It would be conceivable to fill the entire interior of the insulating housing. This is made possible since there will never be any problem with regard to inserting the cable due to obstructing insulating gel, since it will always be possible to install the cable through the pipe-shaped member 18.

The insulating gel can be of any suitable type, e.g. a polymer, a silicone gel. The insulating gel 23 may be of a type that is compressible. The stress controller device 5 and the surrounding insulating gel 23 thereby may constitute a compressible unit which allows for the cable termination device to be used for cables of different diameters. The insulating gel 23 could be of a type that can be poured into the insulator housing, normally with the insulator housing in an upright position, and that would change into a gel after it has been poured into the insulator housing 1. It should then have a consistency that will keep it firmly in place even if the cable termination device is transported lying on its side. The insulating gel should also have good adhesion capability to the internal wall of the insulator housing and also to the stress controller device, in order to completely fill out the space 26 formed between the inner wall 12 of the insulator housing 1 and the stress controller device 5, and also part of the pipe-shaped member 18 as applicable.

In FIG. 2 is schematically shown another embodiment of the inventive cable termination device. In this embodiment, the electrically conducting element 40 is provided as an electric conductor 35 running inside and alongside the pipe-shaped member 18. The electric conductor 35 will run in the narrow empty space existing between the inner wall of the pipe-shaped member 18 and the cable 30, when the cable termination device has been installed on a cable. The pipe-shaped member is suitably of an electrically insulating material. The electric conductor 35 in this case constitutes the electrically conducting element 40 that connects the second upper deflector 22 with the conductor connector 20 and it will function in the same way as the electrically conducting element 40/pipe-shaped member 18 in FIG. 2.

In FIG. 3 is schematically shown another embodiment of the inventive cable termination device. In this embodiment, the pipe-shaped member 18 has a wall made of two layers. It comprises a first, outer layer 38 made of an electrically insulating material and a second, inner layer 39 made of an electrically conducting material. The second electrically conducting layer 39 in this case constitutes the electrically conducting element 40 that connects the second upper deflector 22 with the conductor connector 20, and it will function in the same way as the electrically conducting element 40/pipe-shaped member 18 in FIG. 1.

In the embodiments of FIGS. 1, 2 and 3, the pipe-shaped member 18 is illustrated as extending all the way from the second upper deflector arrangement 22 to the conductor connector 20. However, this does not necessarily have to be the case. It is conceivable, in particular as a variant of the embodiment shown in FIG. 2, that the pipe-shaped member only reaches some distance above the second upper end 25 of the stress controller device without extending all the way up to the end cap, as is illustrated in FIG. 4. The pipe-shaped member will then have an upper free end 36, i.e. free in relation to the insulator housing. In such a case, the level of gel will always be kept below the upper free end 36 of the pipe-shaped member, in order not to obstruct insertion of the cable. However, the electric conductor 35, forming the electrically conducting element 40, will nevertheless go all the way from the second upper deflector arrangement 22 to the conductor connector 20 in order to function in the same way as the electrically conducting element 40/pipe-shaped member 18 in FIG. 2.

According to the present invention is also offered a method involving the provision of a prefabricated cable termination device. The method comprises:
    mounting a stress controller device 5, having a hollow interior 19 adapted for insertion of a cable 30, and having a first 21 and a second 22 deflector arrangement of which the first deflector arrangement is connectable to an outer conductive or semi-conductive layer 33 of a cable, inside a hollow interior of an insulator housing 1, said insulator housing having a first end 10 and a second end 11, by mounting the stress controller device by a first end 24 to the second end 11 of the insulator housing, said second end 11 of the insulator housing having an opening for insertion of a cable 30 into the insulator housing 1 via its second end 11, mounting a pipe-shaped member 18 at a second end 25 of the stress controller device 5, which second end is located inside the insulator housing, such that the pipe-shaped member extends inside the insulator housing in a direction towards the end cap 15 and at least partly up to the end cap and which pipe-shaped member 18 is adapted to receive a cable 30, whereby a space 26 is formed between an inner wall 12 of the insulator housing 1 and the stress controller device 5 combined with the pipe-shaped member 18, mounting an electrically conducting element 40 inside the insulator housing by connecting the electrically conducting element to a deflector arrangement 22 for controlling an electric field, which is provided at the second end 25 of the stress controller device 6, and further connecting the electrically conducting element 40 to a conductor connector 20 at the end cap 5, which conductor connector 20 is adapted for connection to a current carrying conductor of a high voltage cable inserted into the cable termination device, and filling an electrically insulating gel 23, preferably in liquid form, into the insulator housing 1 such that said space 26 is at least partly filled with insulating gel.

The manufacturing of the cable termination device would normally also include sealing the insulator housing 1 at an upper end 10 thereof. According to the invention, this may be performed as part of the prefabrication process for the cable termination device, or it may alternatively be done at the installation site when the cable termination device is installed on the cable.

Further, the method may comprise mounting of the pipe-shaped member 18 and mounting of the electrically conducting element 40 made in one and the same step by mounting a pipe-shaped member made of an electrically conducting material, thus forming an electrically conducting element, between the deflector arrangement 22 provided at the second end 25 of the stress controller device 6 and the conductor connector 20.

Alternatively, the method may comprise mounting of the pipe-shaped member 18 and mounting of the electrically conducting element 40 made in one and the same step by mounting a pipe-shaped member comprising a first layer 38 made of an electrically insulating material and a second layer 39 made of an electrically conducting material, and said second layer constituting said electrically conducting element 40, between the deflector arrangement 22 provided at the second end 25 of the stress controller device 6 and the conductor connector 20.

According to another alternative, the method may comprise mounting of the electrically conducting element 40 at least partly alongside and inside the pipe-shaped member 18. The electrically conducting element may then be a simple electric conductor 35.

Further, the manufacturing of the cable termination device may also include preparation of the stress controller device 5 by mounting the stress control member 6 on the support pipe 7 thereby forming the stress controller device 5, and connecting the stress control member by means of the support pipe to the insulator housing 1.

The cable 30 shall also undergo the necessary preparation for the installation, such as removal of its outer conducting or semi-conducting layer 33 at the end of the cable, and also removal of the insulating layer 32 at the outermost end of the cable thus preparing the inner current carrying conductor 31 for connection to the external electrical connection 17.

The prefabricated cable termination device is self supporting and it could be installed on the cable in a vertically upright position or at an angle to the vertical plane, up to approximately 45°. The prefabricated cable termination device is dry before and after installation, and it is ready to be used, i.e. installed on a cable, with no extra devices.

The present invention is not limited to the disclosed examples, but may be modified in many ways that would be apparent to the skilled person, within the scope of the appended claims.

What is claimed is:

1. A cable termination device of the dry type, for terminating a high voltage cable, comprising:
    an insulator housing with a first end and a second end and having a hollow interior, which second end has an opening for insertion of a high voltage cable,
    a stress controller device located inside the insulator housing and adapted to be mounted on a high voltage cable, which stress controller device is provided with a first and a second deflector arrangement for controlling an electric field,
    an end cap located at the first end of the insulator housing and provided with an external electrical connector,
    an electrically conducting element that is electrically connected at one end to the second deflector arrangement and electrically connected at the electrically conducting element's other end to a conductor connector at the end cap, which conductor connector is adapted for connection to a current carrying conductor of a high voltage cable connectable to the cable termination device by the external electrical connector,
    wherein the first deflector arrangement is adapted to be electrically connectable to an outer conductive or semi-conductive layer of a cable, and
    the cable termination device further comprises an electrically insulating gel filling at least part of the hollow interior of the insulator housing and surrounding at least part of the stress controller device.

2. The cable termination device according to claim 1, wherein the stress controller device has a first end mounted at the second end of the insulator housing and the stress controller extends from the second end of the insulator housing and into the insulator housing where the stress controller has a second end, and wherein the second deflector arrangement is arranged at said second end of the stress controller device.

3. The cable termination device according to claim 1, further comprising a pipe-shaped member arranged extending inside the insulator housing from the second deflector arrangement of the stress controller device in a direction towards the end cap and at least partly up to the end cap and which pipe-shaped member is adapted to receive a cable, whereby a space is formed between an inner wall of the insulator housing and the stress controller device combined with the pipe-shaped member and that said space is at least partly filled with insulating gel.

4. The cable termination device according to claim 3, wherein the pipe-shaped member is made of an electrically conducting material and thereby the pipe-shaped member constitutes the electrically conducting element.

5. The cable termination device according to claim 3, wherein the pipe-shaped member comprises a first layer of an electrically insulating material and a second layer made of an electrically conducting material, and said second layer constitutes said electrically conducting element.

6. The cable termination device according to claim 3, wherein the pipe-shaped member is of an electrically insulating material and the electrically conducting element is an electric conductor running at least partly alongside and inside the pipe-shaped member.

7. The cable termination device according to claim 6,
wherein the pipe-shaped member does not extend all the way up to the end cap,
wherein the maximum level of gel inside the insulator housing is below an upper free end of the pipe-shaped member, and
wherein the electric conductor runs all the way up and is connected to the conductor connector at the end cap.

8. The cable termination device according to claim 1,
wherein the stress controller device comprises a stress control member and a support pipe,
wherein the stress control member is mounted to the second end of the insulator housing by the support pipe,
wherein the first deflector arrangement is provided at one end of the stress control member that is connected to the support pipe and the second deflector arrangement is provided at the opposite end of the stress control member forming the second end of the stress controller device.

9. The cable termination device according to claim 1, wherein the cable termination device is self supporting.

10. The cable termination device according to claim 1, wherein the stress controller device and the surrounding electrically insulating gel form a compressible unit which adapts to different cable diameters.

11. The cable termination device according to claim 1, wherein the cable termination device is prefabricated, before installation on a cable.

12. A method for prefabricating a cable termination device for a high voltage cable, comprising:
mounting a stress controller device, having a hollow interior adapted for insertion of a cable, and having a first and a second deflector arrangement of which the first deflector arrangement is connectable to an outer conductive or semi-conductive layer of a cable, inside a hollow interior of an insulator housing, said insulator housing having a first end and a second end, by mounting the stress controller device by a first end to the second end of the insulator housing, said second end of the insulator housing having an opening for insertion of a cable into the insulator housing,
mounting a pipe-shaped member at a second end of the stress controller device, which second end is located inside the insulator housing, such that the pipe-shaped member extends inside the insulator housing in a direction towards the end cap and at least partly up to the end cap, the end cap provided with an external electrical connector, and which pipe-shaped member is adapted to receive a cable, whereby a space is formed between an inner wall of the insulator housing and the stress controller device combined with the pipe-shaped member,
mounting an electrically conducting element inside the insulator housing by connecting the electrically conducting element to the second deflector arrangement for controlling an electric field, which second deflector arrangement is provided at the second end of the stress controller device, and further connecting the electrically conducting element to a conductor connector at the end cap, which conductor connector is adapted for connection to a current carrying conductor of a high voltage cable inserted into the cable termination device by the electrical connector, and
filling an electrically insulating gel into the insulator housing such that said space is at least partly filled with insulating gel surrounding at least part of the stress controller device.

13. The method according to claim 12, wherein mounting of the pipe-shaped member and mounting of the electrically conducting element is made in one and the same step by mounting a pipe-shaped member made of an electrically conducting material, thus forming an electrically conducting element, between the deflector arrangement provided at the second end of the stress controller device and the conductor connector.

14. The method according to claim 12, wherein mounting of the pipe-shaped member and mounting of the electrically conducting element is made in one and the same step by mounting a pipe-shaped member comprising a first layer made of an electrically insulating material and a second layer made of an electrically conducting material, and said second layer constituting said electrically conducting element, between the deflector arrangement provided at the second end of the stress controller device and the conductor connector.

15. The method according to claim 14, further comprising mounting an electric conductor, forming the electrically conducting element, at least partly alongside and inside the pipe-shaped member.

16. The method according to claim 12, further comprising mounting a stress control member on a support pipe thereby forming the stress controller device, and connecting the stress controller device by the support pipe to the insulator housing and/or the base member.

17. A method for achieving a cable termination on a high voltage cable, comprising:
installing a prefabricated cable termination device on a high voltage cable, the cable termination device comprising an insulator housing with a first end and a second end and having a hollow interior, which second end has an opening for insertion of a high voltage cable,
wherein a stress controller device is located inside the insulator housing and adapted to be mounted on a high voltage cable, which stress controller device is provided with a first and a second deflector arrangement for controlling an electric field,
an end cap is located at the first end of the insulator housing and provided with an external electrical connector,
an electrically conducting element is electrically connected at one end to the second deflector arrangement and electrically connected at its other end to a conductor connector at the end cap, which conductor connector is adapted for connection to a current carrying conductor of a high voltage cable connectable to the cable termination device by the external electrical connector,
the first deflector arrangement is adapted to be electrically connectable to an outer conductive or semi-conductive layer of a cable, and
the cable termination device further comprises an electrically insulating gel filling at least part of the hollow interior of the insulator housing and surrounding at least part of the stress controller device.

* * * * *